United States Patent [19]

Wakimoto et al.

[11] Patent Number: 4,929,066
[45] Date of Patent: May 29, 1990

[54] TELECENTRIC IMAGE-FORMING OPTICAL SYSTEM FOR LARGE IMAGE SIZE

[75] Inventors: Zenji Wakimoto; Takahisa Hayashi, both of Kyoto, Japan

[73] Assignee: Dainippon Screen Mfg. Co., Ltd., Japan

[21] Appl. No.: 219,552

[22] Filed: Jul. 14, 1988

[30] Foreign Application Priority Data

Jul. 14, 1987 [JP] Japan .................................. 62-176808

[51] Int. Cl.$^5$ .......................... G02B 13/22; G02B 9/64
[52] U.S. Cl. ..................................... 350/415; 350/463
[58] Field of Search .................. 350/415, 6.8, 6.7, 463

[56] References Cited

U.S. PATENT DOCUMENTS 4,300,817 11/1981 Betensky .............................. 350/412
4,588,265  5/1986 Takahashi ........................... 350/415

Primary Examiner—Scott J. Sugarman
Attorney, Agent, or Firm—Ostrolenk, Faber, Gerb & Soffen

[57] ABSTRACT

A telecentric image-forming optical system comprising a first lens group including a double-convex lens, a meniscus lens whose convex side faces an object or a plano-convex lens, and a double-concave lens arranged in this order; and a second lens group including a double-convex lens, a meniscus lens whose convex side faces an image or a plano-convex lens, and a double-concave lens arranged in this order, wherein the secondary focal point of the first lens group and the principal focal point of the second lens group substantially coincide with each other in the vicinity of a double-convex lens. The telecentric image-forming optical system is compact and forms an image which is large sized in relation to the compact length of the system.

15 Claims, 15 Drawing Sheets

TELECENTRIC IMAGE-FORMING OPTICAL SYSTEM FOR LARGE IMAGE SIZE

BACKGROUND OF THE INVENTION

1. Field of the Invention

The present invention relates to a telecentric image-forming optical system through which a principal ray passes in a direction parallel to the optical axis of the system, and more particularly, to a telecentric image-forming optical system in which an image size is large compared to the distance between the object and the image, and the magnification of the system is one or approximately one.

2. Description of the Prior Art

In known telecentric image-forming optical systems, the secondary focal point of a first lens group having a positive focal length and disposed in front of a lens disposed at the center of the optical system coincides with the principal focal point of a second lens group which also has a positive focal length and which is disposed behind the center lens. In this arrangement, when an object (or a real image formed by an optical system disposed in front of the first lens group) is placed in the vicinity of the principal focal point of the first lens group, a real image is formed in the vicinity of the secondary focal point of the second lens group. The magnification of the real image corresponds to the ratio of the focal lengths of the lens groups.

If the intervals between the principal points of the lenses are ignored, the distance between the object and the image is approximately twice as great as the sum of the focal lengths of the lens groups.

In such a system, it is difficult to create a wide angle view. Therefore, if a large image size is required, the optical system itself must be large, which causes an apparatus which incorporates the optical system to be undesirably large.

Apparatuses in which the optical system is incorporated include an image reader for reading an original document by a solid image sensor (for example, CCD), and exposing apparatus for printing mask patterns of an IC and an LSI on a semiconductor wafer, a scanning recording apparatus such as a laser plotter, a laser printer and the like. A telecentric image-forming optical system is useful in these apparatuses because the magnification of such a system does not vary if the object distance is changed. Further, using a telecentric image-forming optical system prevents degradation of resolution and reduction of the intensity of marginal rays.

SUMMARY OF THE INVENTION

The present invention solves the above-described problems and has as its object to provide a telecentric image-forming optical system having the following construction.

The telecentric image-forming optical system in accordance with the present invention comprises a first lens group and a second lens group. The first group includes a double-convex lens, a meniscus lens whose convex side faces the object or a plano-convex lens, and a double-concave lens arranged in this order as viewed from the object. The second lens group includes a double-convex lens, a meniscus lens whose convex side faces the image or a plano-convex lens, and a double-concave lens arranged in this order as viewed from the image. The secondary focal point of the first lens group and the principal focal point of the second lens group substantially coincide with each other at a first point. A third double-convex lens having a positive focal length is disposed in the center between the first lens group and the second lens group. The third lens is disposed in the vicinity of the first point.

Since the double-convex lens is interposed between the first and second lens groups, the telecentric characteristic is maintained, and the object distance and the image distance are short. Accordingly, the total distance between the object and the image is short.

The refracting power of the third convex lens can create a large curvature of field. In order to prevent such an occurrence, a concave lens having a negative focal length is disposed within each of the first and second lens groups. The concave lenses correct the curvature of field, whereby the image surface can be flattened and the image size can be enlarged.

BRIEF DESCRIPTION OF THE DRAWINGS

The objects and the features of the present invention will become apparent from the following description when taken in conjunction with preferred embodiments thereof with reference to the accompanying drawings in which.

DETAILED DESCRIPTION OF THE INVENTION

First Embodiment

Figure 1:
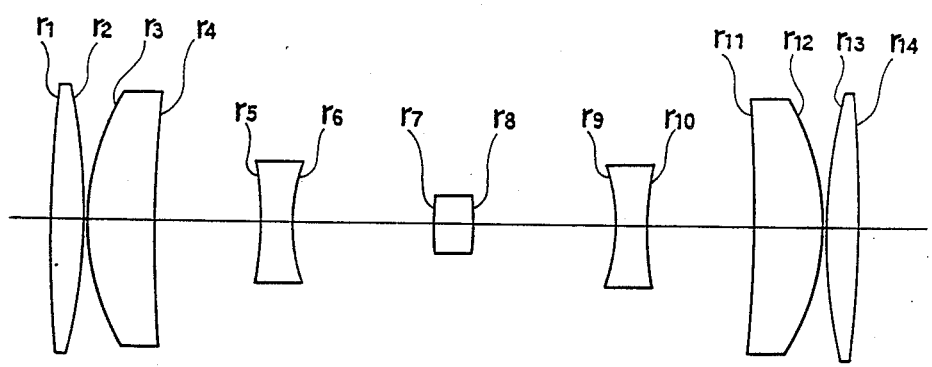
FIG. 1 is a lens arrangement view showing the essential construction and arrangement of a telecentric image-forming optical system in accordance with the present invention.

A first embodiment shown in FIG. 1 shows the fundamental construction and arrangement of a telecentric image-forming optical system, in accordance with the present invention, in which two lens groups are symmetrical about the central plane of a double-convex lens (hereinafter referred to as the "center lens"). As shown, the center lens is disposed in the center of the optical system. Lens data for the lens groups shown in FIG. 1 are listed in TABLE 1.

TABLE 1

|  | r | d | n | ν |
|---|---|---|---|---|
| 1 | 352.25 | 6.3 | 1.603 | 65.4 |
| 2 | −116.50 | 0.6 | | |
| 3 | 45.87 | 14.7 | 1.620 | 63.5 |
| 4 | 545.00 | 21.1 | | |
| 5 | −68.90 | 6.3 | 1.616 | 31.0 |
| 6 | 33.95 | 29.3 | | |
| 7 | 72.00 | 8.0 | 1.486 | 81.8 |
| 8 | −72.00 | 29.3 | | |
| 9 | −33.95 | 6.3 | 1.616 | 31.0 |
| 10 | 68.90 | 21.1 | | |
| 11 | −545.00 | 14.7 | 1.620 | 63.5 |
| 12 | −45.87 | 0.6 | | |
| 13 | 116.50 | 6.3 | 1.603 | 65.4 |
| 14 | −352.25 | | | |

$d_0$: 127.39;
Distance between object and image: 419.38;
Image-forming magnification: 1.0;
Dimension of image plane: 40 φ;
F-number: 9.1 (NA:0.055)

where
- (r) represents the radius of curvature of the faces of the respective lenses;
- ($d_0$) shows the distance between the object and the face of curvature $r_1$;
- $d_1$ through $d_{13}$ denote the center thickness of the respective lenses or the interval between the lenses along the optical axis;
- (n) represents the refractive indexes of the respective lenses relative to a wavelength of 587.6 nm;
- (ν) shows the Abbe number of the respective lenses.

Figure 2:
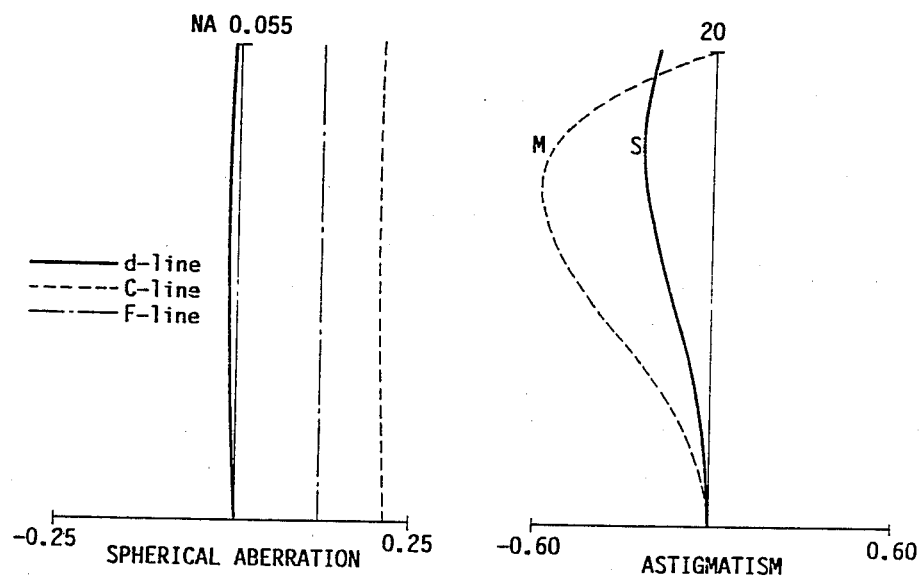
FIG. 2 shows aberration curves showing the spherical aberration and the astigmatism of the first embodiment shown in FIG. 1.

FIG. 2 shows aberration curves showing the spherical aberration and the astigmatism of the first embodiment.

In the first embodiment, the lens system is composed of all single lenses, but preferably some lenses are cemented to each other with a glass material having a different refractive index and dispersion so as to correct chromatic aberrations. The glass material herein includes a plastic material.

In each of the second through eighth embodiments (described hereinafter), lenses are cemented to each other to correct chromatic aberrations and flatten image surfaces. In order to simplify the drawings, a plane face at a right angle to the optical axis is shown at the left of each drawing. This plane face represents a vertical cut through the center lens. Only lenses disposed behind the plane face are shown.

Accordingly, in the second through eighth embodiments, $r_1 = \infty$, which corresponds to the above-described plane face.

Each of the drawings (FIG. 3 through 16) of spherical aberrations and astigmatisms in the second through eighth embodiment shows only the portion behind the plane face. Therefore, when the lens groups are arranged symmetrically with respect to the plane face in each of the second through eighth embodiments, the spherical aberration and the astigmatism are more than twice as large as those shown in the drawings.

Second Embodiment

Figure 3:
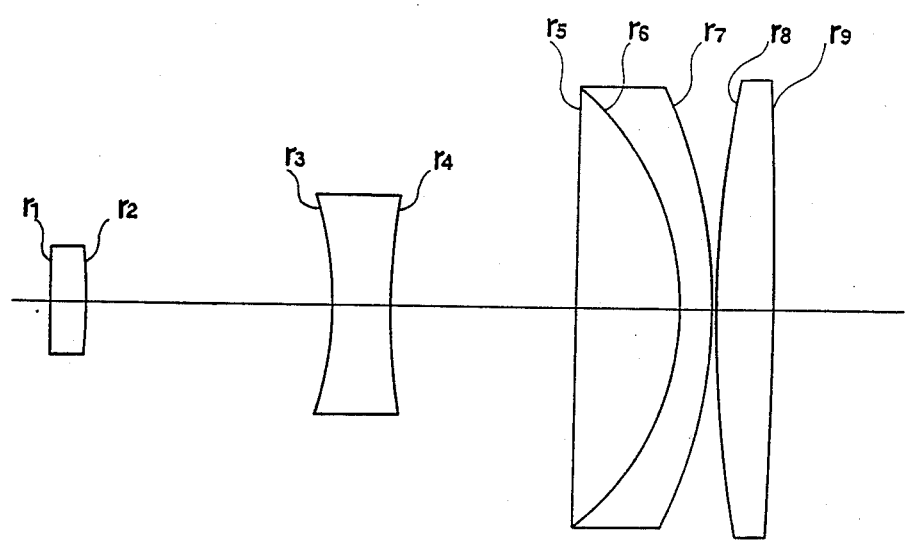
FIG. 3 is a lens arrangement and construction view showing a second embodiment.

FIG. 3 is a lens construction and arrangement view showing a second embodiment in which one lens group shows cemented together to correct the chromatic aberration and flatten the image surface. Lens data for the respective lens groups shown in FIG. 3 are listed in TABLE 3.

TABLE 2

|  | r | d | n | ν |
|---|---|---|---|---|
| 1 | ∞ | 4.4 | 1.593 | 67.9 |
| 2 | −95.83 | 30.0 | | |
| 3 | −40.70 | 6.9 | 1.595 | 35.5 |
| 4 | 75.16 | 22.8 | | |
| 5 | −2380.00 | 12.5 | 1.697 | 55.6 |
| 6 | −33.57 | 3.9 | 1.648 | 33.8 |
| 7 | −60.76 | 0.6 | | |
| 8 | 146.55 | 6.9 | 1.697 | 55.6 |
| 9 | −463.87 | | | |

Focal length: 100;

where
- (r) represents the radius of curvature of the faces of the respective lenses;
- $d_1$ through $d_8$ denote the thickness of the respective lenses or the distance between the adjacent faces of the lenses;
- (n) represents the refractive index of the respective lenses relative to a wavelength of 587.6 nm;
- (ν) shows the Abbe number of the respective lenses.

Figure 4:
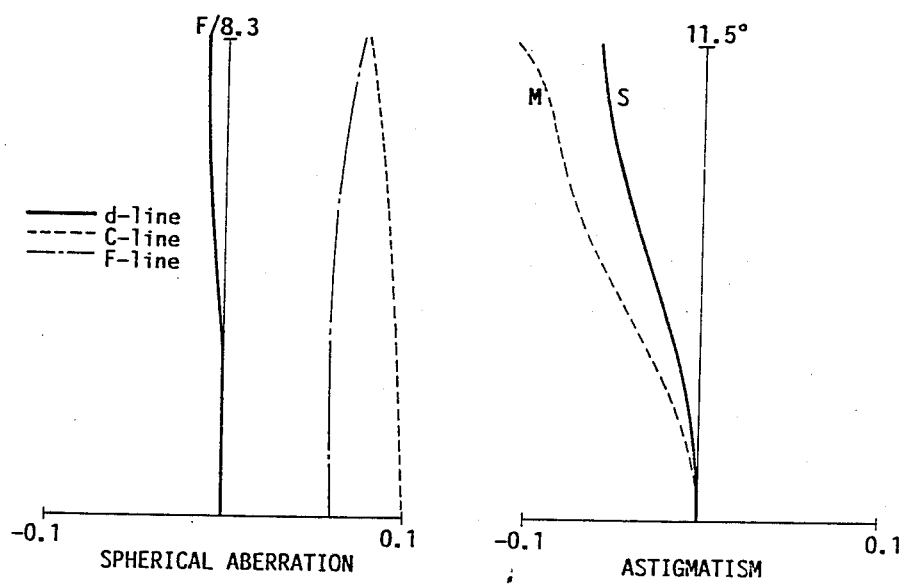
FIG. 4 shows aberration curves of the second embodiment.

FIG. 4 are aberration curves showing the spherical aberration and the astigmatism of the second embodiment.

Third Embodiment

Figure 5:
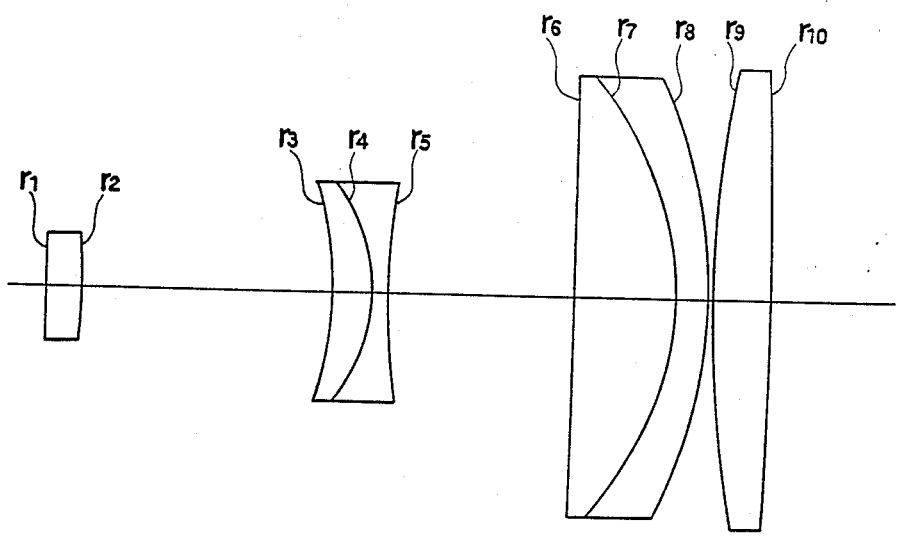
FIG. 5 is a lens construction and arrangement view showing a third embodiment.

FIG. 5 shows a lens construction and arrangement view showing a third embodiment in which two lens groups are cemented to each other to correct the chromatic aberration and flatten the image surface. Lens data of the respective lens groups shown in FIG. 5 are listed in TABLE 3.

TABLE 3

|   | r        | d     | n     | ν    |
|---|----------|-------|-------|------|
| 1 | ∞        | 4.3   | 1.620 | 60.3 |
| 2 | −99.00   | 30.3  |       |      |
| 3 | −39.60   | 5.0   | 1.623 | 58.2 |
| 4 | −18.80   | 1.8   | 1.613 | 37.0 |
| 5 | 78.35    | 22.55 |       |      |
| 6 | −2400.00 | 12.4  | 1.694 | 53.8 |
| 7 | −37.10   | 3.8   | 1.651 | 38.2 |
| 8 | −58.80   | 0.6   |       |      |
| 9 | 144.80   | 6.8   | 1.694 | 53.8 |
| 10| −457.35  |       |       |      |

Focal length: 100;
F-number: 8.3;
Back focus: 120.74;
Image size: 40 φ (angle of view: 23°)

Figure 6:
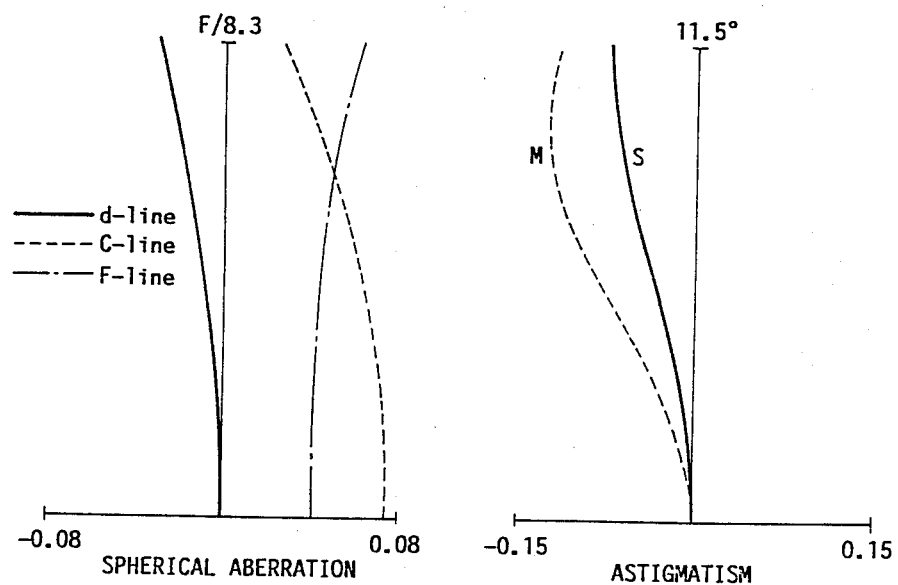
FIG. 6 shows aberration curves of the third embodiment.

FIG. 6 are aberration curves showing the spherical aberration and the astigmatism of the third embodiment.

Fourth Embodiment

Figure 7:
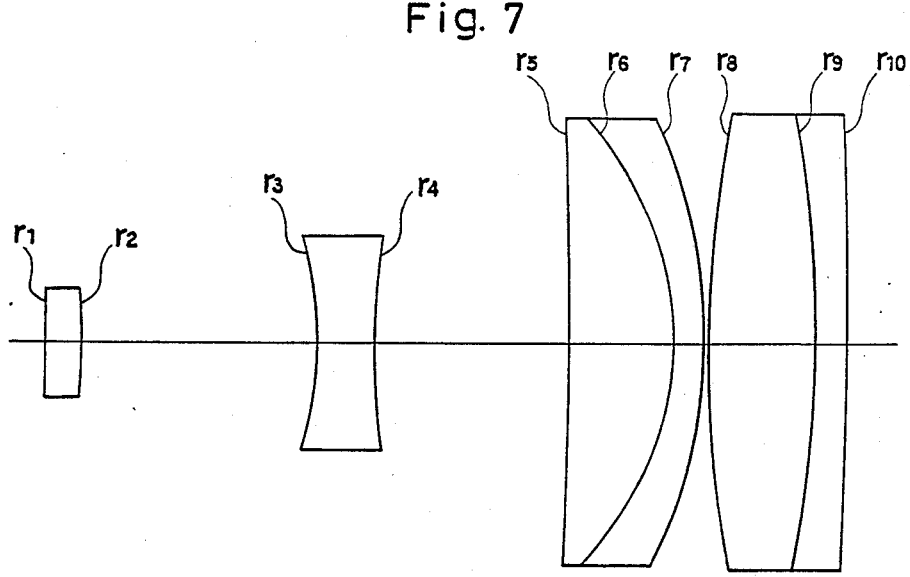
FIG. 7 is a lens construction and arrangement view showing a fourth embodiment.

FIG. 7 is a lens construction and arrangement view showing a fourth embodiment in which, similarly to the third embodiment, two lens groups are cemented to each other. Lens data for the respective lens groups shown in FIG. 7 are listed in TABLE 4.

TABLE 4

|   | r        | d    | n     | ν    |
|---|----------|------|-------|------|
| 1 | ∞        | 4.4  | 1.620 | 60.3 |
| 2 | −102.60  | 28.8 |       |      |
| 3 | −42.70   | 7.0  | 1.620 | 36.3 |
| 4 | 80.90    | 23.4 |       |      |
| 5 | −1930.00 | 13.0 | 1.694 | 53.8 |
| 6 | −37.20   | 3.7  | 1.648 | 33.8 |
| 7 | −60.90   | 0.6  |       |      |
| 8 | 151.20   | 13.0 | 1.694 | 53.8 |
| 9 | −132.00  | 3.7  | 1.689 | 31.1 |
| 10| −404.00  |      |       |      |

Focal length: 100;
F-number: 8.3;
Back focus: 118.82;
Image size: 40 φ (angle of view: 23°)

Figure 8:
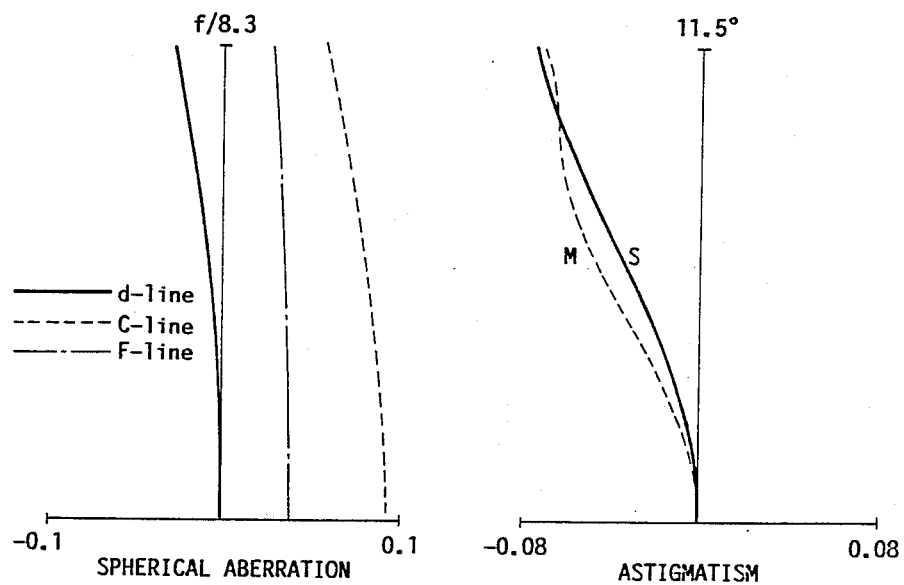
FIG. 8 shows aberration curves of the fourth embodiment.

FIG. 8 are aberration curves showing the spherical aberration and the astigmatism of the fourth embodiment.

Fifth Embodiment

Figure 9:
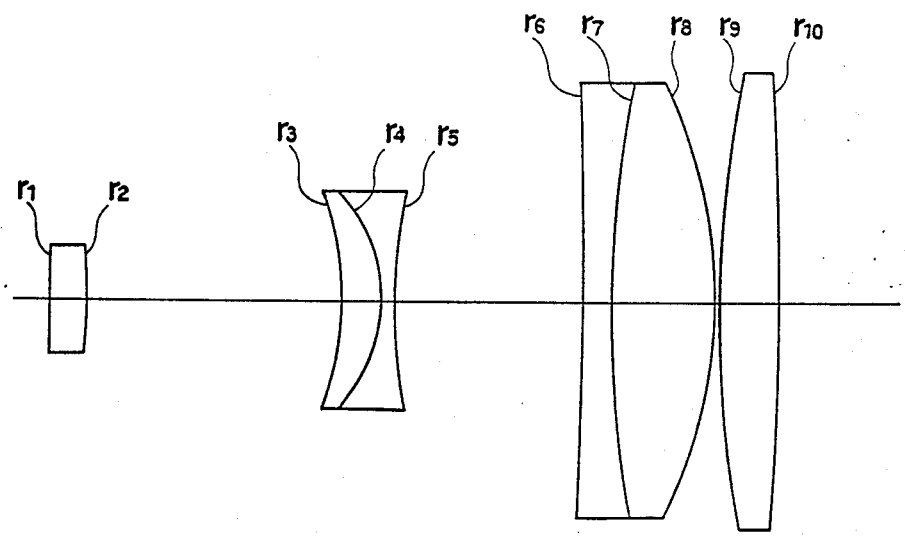
FIG. 9 is a lens construction and arrangement view showing a fifth embodiment.

FIG. 9 shows a lens construction and arrangement view showing a fifth embodiment in which, similarly to the third and fourth embodiments, two lens groups are cemented to correct the chromatic aberration and flatten the image surface. Lens data for the respective lens groups shown in FIG. 9 are listed in TABLE 5.

TABLE 5

|   | r        | d    | n     | ν    |
|---|----------|------|-------|------|
| 1 | ∞        | 4.3  | 1.620 | 60.3 |
| 2 | −98.45   | 30.8 |       |      |
| 3 | −41.00   | 5.0  | 1.620 | 60.3 |
| 4 | −18.45   | 1.8  | 1.613 | 37.0 |
| 5 | 77.75    | 22.4 |       |      |
| 6 | −2100.00 | 3.8  | 1.651 | 38.2 |
| 7 | 144.00   | 12.3 | 1.694 | 53.8 |
| 8 | −58.45   | 0.6  |       |      |
| 9 | 144.00   | 6.8  | 1.694 | 53.8 |
| 10| −455.30  |      |       |      |

Focal length: 100;
F-number: 8.3;
Back focus: 118.38;

TABLE 5-continued

| r | d | n | ν |
|---|---|---|---|

Image size: 40 φ (angle of view: 23°)

Figure 10:
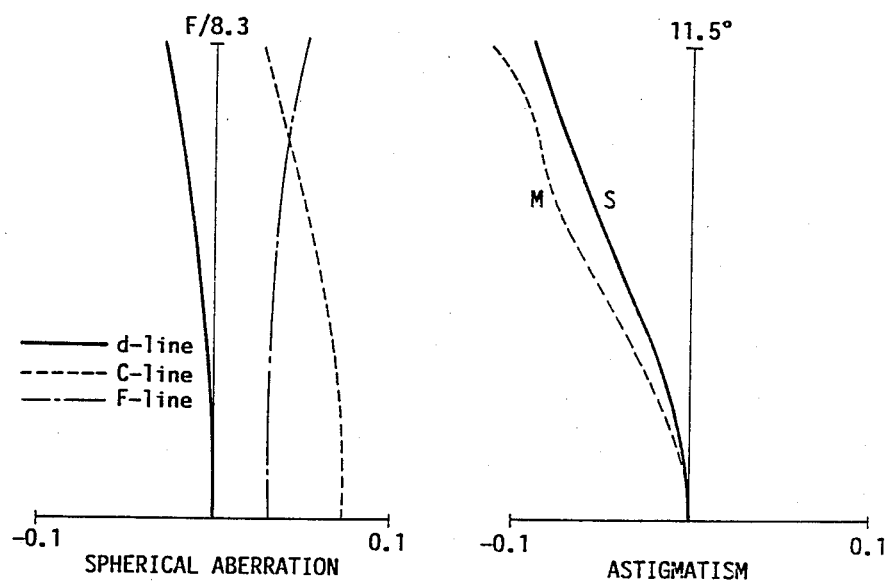
FIG. 10 shows aberration curves of the fifth embodiment.

FIG. 10 are aberration curves showing the spherical aberration and the astigmatism of the fifth embodiment.

Sixth Embodiment

Figure 11:
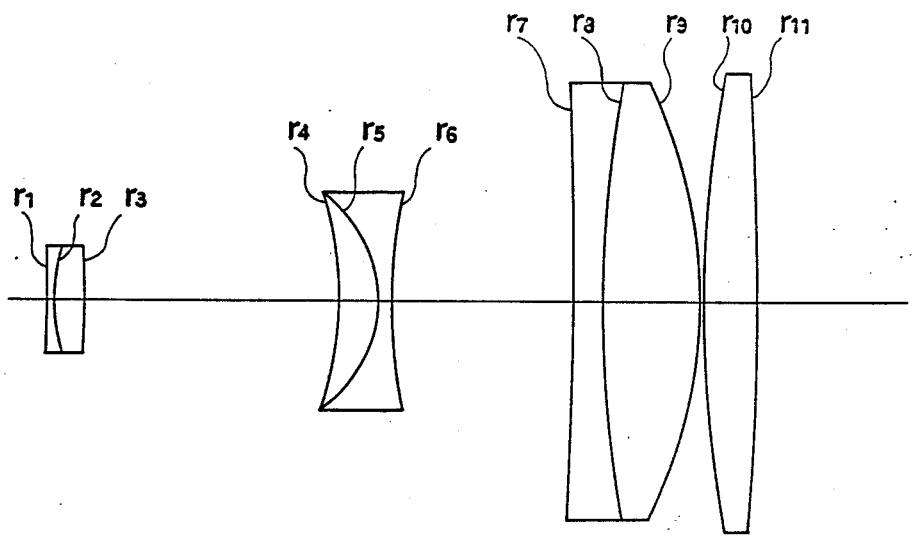
FIG. 11 is a lens construction and arrangement view showing a sixth embodiment.

FIG. 11 shows a lens construction and arrangement view showing a sixth embodiment in which three lens groups are cemented to each other to correct the chromatic aberration and flatten the image surface. Lens data for the respective lens groups shown in FIG. 11 are listed in TABLE 6.

TABLE 6

|   | r       | d    | n     | ν    |
|---|---------|------|-------|------|
| 1 | ∞       | 1.0  | 1.613 | 44.4 |
| 2 | 25.00   | 3.6  | 1.613 | 58.5 |
| 3 | −95.50  | 31.0 |       |      |
| 4 | −39.40  | 4.8  | 1.620 | 60.3 |
| 5 | −15.50  | 1.8  | 1.613 | 44.4 |
| 6 | 75.80   | 21.7 |       |      |
| 7 | −770.00 | 3.6  | 1.613 | 44.4 |
| 8 | 141.00  | 12.0 | 1.694 | 53.8 |
| 9 | −57.30  | 0.3  |       |      |
| 10| 143.20  | 6.5  | 1.694 | 53.8 |
| 11| −394.00 |      |       |      |

Focal length: 100;
F-number: 8.3;
Back focus: 118.49;
Image size: 40 φ (angle of view: 23°)

Figure 12:
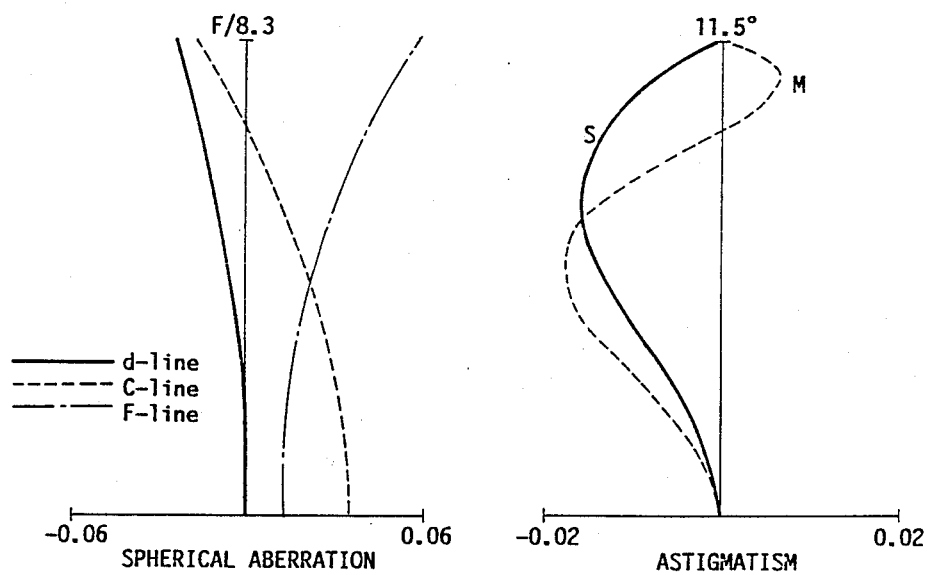
FIG. 12 shows aberration curves of the sixth embodiment.

FIG. 12 are aberration curves showing the spherical aberration and the astigmatism of the sixth embodiment.

When the lenses shown in FIG. 11 are symmetrical with respect to the above-described plane surface, two lenses are cemented to the double-convex center lens. Thus, the center lens is disposed at the center of three lenses. In this lens system, five convex lenses are made of Kruz-Flint glass. The use of Kruz-Flint glass reduces the chromatic aberration by ½ to ⅓ times.

Seventh Embodiment

Figure 13:
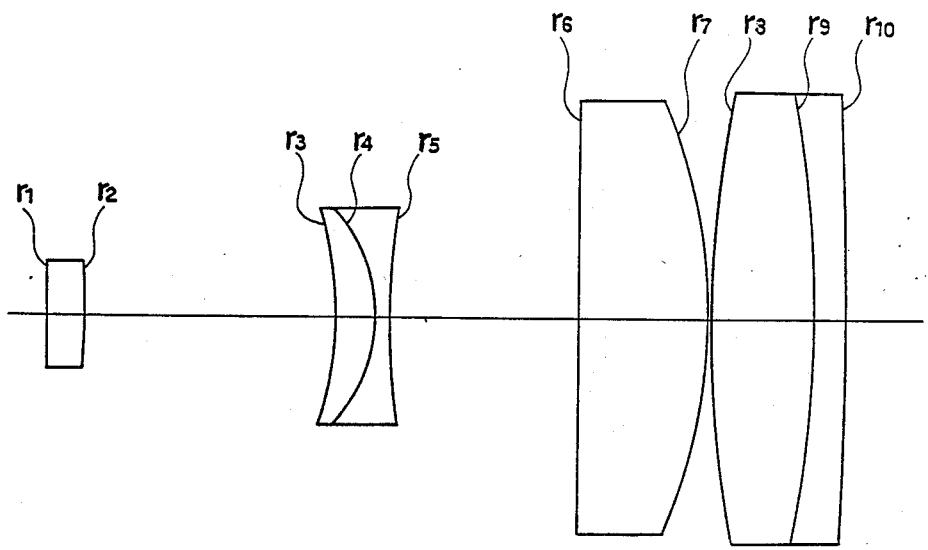
FIG. 13 is a lens construction and arrangement view showing a seventh embodiment.

FIG. 13 shows a lens construction and arrangement view showing a seventh embodiment in which the combination of lenses is different from those of the third through fifth embodiments, but similarly to these three embodiments, two lens groups are cemented to each other. Lens data for the respective lens groups shown in FIG. 13 are listed in TABLE 7.

TABLE 7

|   | r        | d     | n     | ν    |
|---|----------|-------|-------|------|
| 1 | ∞        | 4.3   | 1.620 | 60.3 |
| 2 | −98.9    | 30.8  |       |      |
| 3 | −41.15   | 1.8   | 1.595 | 35.5 |
| 4 | 30.2     | 5.0   | 1.620 | 60.3 |
| 5 | 78.75    | 22.65 |       |      |
| 6 | −1850.00 | 16.00 | 1.694 | 53.8 |
| 7 | −59.35   | 0.5   |       |      |
| 8 | 144.70   | 12.5  | 1.694 | 53.8 |
| 9 | −120.00  | 3.5   | 1.648 | 33.8 |
| 10| −457.40  |       |       |      |

Focal length: 100;
F-number: 8.3;
Back focus: 111.37;
Image size: 40 φ (angle of view: 23°)

Figure 14:
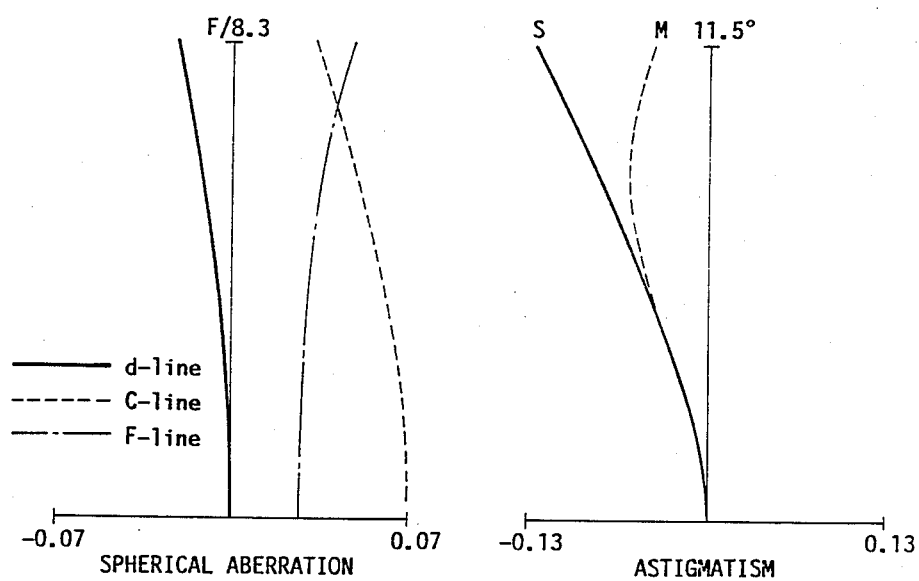
FIG. 14 shows aberration curves of the seventh embodiment.

FIG. 14 shows aberration curves showing the spherical aberration and the astigmatism of the seventh embodiment.

Eighth Embodiment

Figure 15:
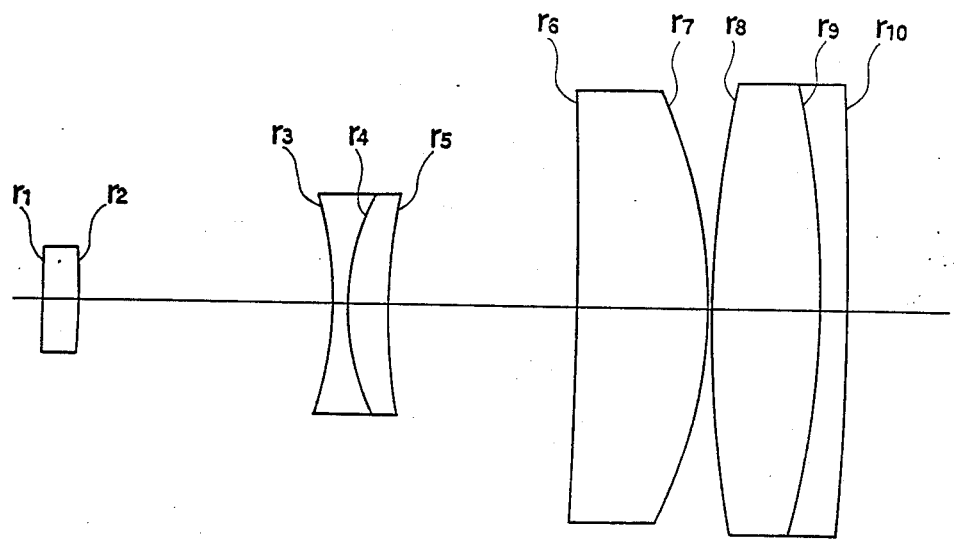
FIG. 15 is a lens construction and arrangement view showing an eighth embodiment.

FIG. 15 shows a lens construction and arrangement view showing an eighth embodiment in which, similarly to the seventh embodiment, two lens groups are cemented to each other. Lens data for the respective lens groups shown in FIG. 15 are listed in TABLE 8.

TABLE 8

|    | r       | d     | n     | ν    |
|----|---------|-------|-------|------|
| 1  | ∞       | 4.3   | 1.620 | 60.3 |
| 2  | −98.90  | 30.7  |       |      |
| 3  | −42.10  | 5.0   | 1.620 | 60.3 |
| 4  | −19.00  | 1.8   | 1.613 | 37.0 |
| 5  | 82.60   | 22.65 |       |      |
| 6  | ∞       | 16.00 | 1.694 | 53.8 |
| 7  | −60.55  | 0.5   |       |      |
| 8  | 144.70  | 12.5  | 1.694 | 53.8 |
| 9  | −120.00 | 3.5   | 1.651 | 38.2 |
| 10 | −457.40 |       |       |      |

Focal length: 100;
F-number: 8.3;
Back focus: 112.07;
Image size: 40 φ (angle of view: 23°)

Figure 16:
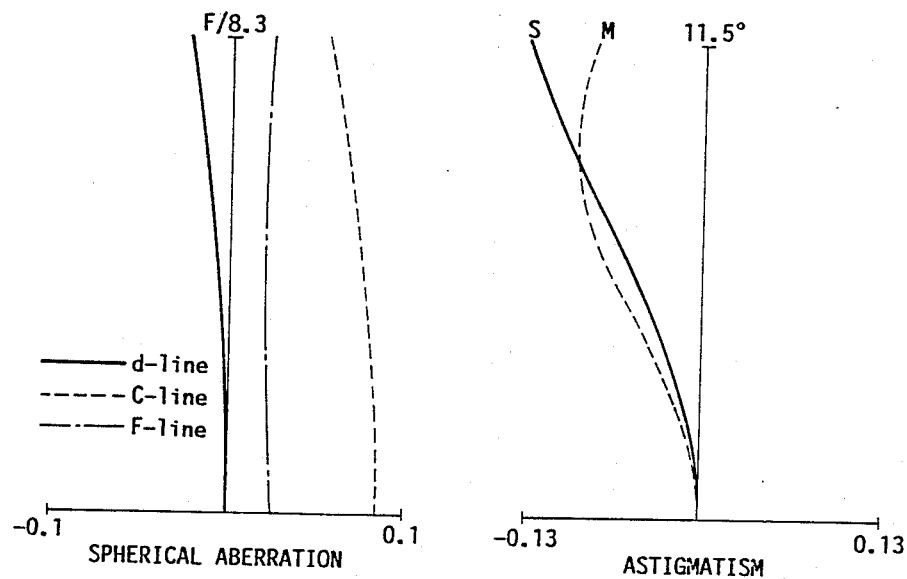
FIG. 16 shows aberration curves of the eigth embodiment.

FIG. 16 illustrates aberration curves showing the spherical aberration and the astigmatism of the eighth embodiment.

The second through eighth embodiments are modifications of the first embodiment in which one lens group consists of lenses cemented to each other with a glass material having a refractive index and a dispersive power different from those of the lenses so as to correct chromatic aberration and flatten the image surface. In each of these embodiments, a double-convex lens is disposed in the center of the lens system.

Figure 25:
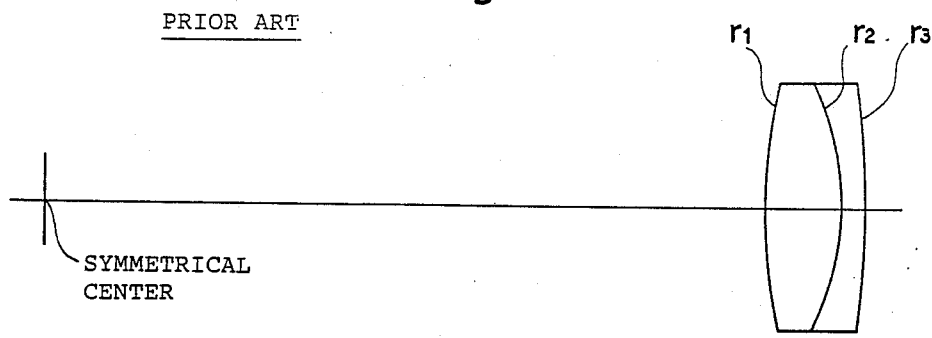
FIG. 25 shows a known telecentric image-forming optical system. The figure only shows the portion which is behind the point at which the focal points of two lens groups of the system coincide with each other.

FIG. 25 shows an example of known telecentric image-forming optical systems in which a double-convex lens is not disposed at the center of the lens system. Lens data for the respective lenses are listed in TABLE 9.

TABLE 9

|   | r       | d    | n     | ν    |
|---|---------|------|-------|------|
| 1 | 85.5    | 10.0 | 1.618 | 52.7 |
| 2 | −34.3   | 3.0  | 1.689 | 31.2 |
| 3 | −136.85 |      |       |      |

$d_0$: 96.0;
Focal length: 100;
F-number: 8.3;
Back focus: 94.60;
Image size: 14 φ (angle of view: 8°)

where
  (r) shows the radii of curvature of the lenses;
  (d) represents the thickness of the lenses;
  (n) denotes the refractive index of the lenses relative to the wavelength of 587.6 nm;
  (ν) indicates Abbe number;
  ($d_0$) denotes the distance between an object and the face of curvature $r_3$ (+136.85) when lenses are arranged symmetrically with respect to the center of the lens system shown in FIG. 25.

Figure 26:
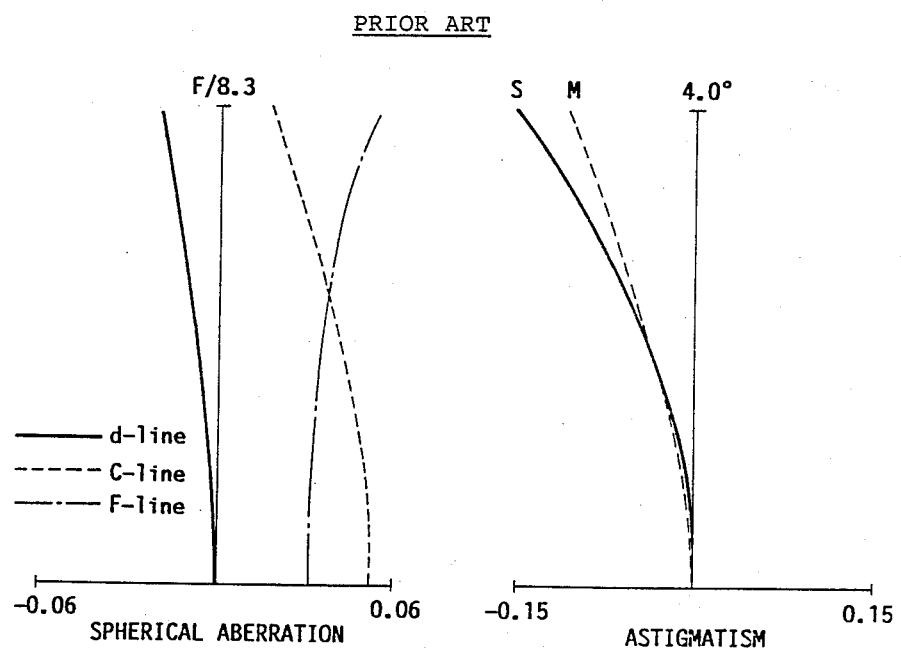
FIG. 26 is a view showing an aberration curve of the prior art system shown in FIG. 25.

FIG. 26 shows the spherical aberration and the astigmatism of the telecentric image-forming optical system shown in FIG. 25.

Comparing the above-described embodiments with the known telecentric image-forming optical system, it is apparent that the telecentric image-forming optical system in accordance with the present invention has a wider angle of view. That is, the total lengths of the telecentric image-forming optical system of the above-described embodiments are almost equal to the known telecentric image-forming optical system shown in FIG. 25, but the dimension of the image plane which can be formed is substantially three times as great as that of the known telecentric image-forming optical system.

In each of the second through eighth embodiments, the principal focal point of the lens system does not coincide with the center of the lens system, but is disposed in the vicinity thereof. This is because the characteristics of the telecentric optical system is not degraded by the spherical aberration of the lens system. Actually, the position of a minimum circle of confusion formed by a parallel light flux from an image incident on the lens system coincides with the above-described center.

Accordingly, the symmetrical arrangement of the lens groups about the above-described plane face in the second through eighth embodiments allows formation of a telecentric image-forming optical system in which the object size is magnified by one, i.e., a large angle of view is wide, that is, the object size is large.

The same effect can be also obtained by making a position a little in front of the above-described plane face the reference face about which the lens system is arranged symmetrically. In this case, an air space is provided in the center face of the double-convex lens.

It is possible to obtain the same effect by combining the lens systems of the second through eighth embodiments. A ninth embodiment (described below) is a combination of the seventh and eighth embodiments.

Ninth Embodiment

Figure 17:
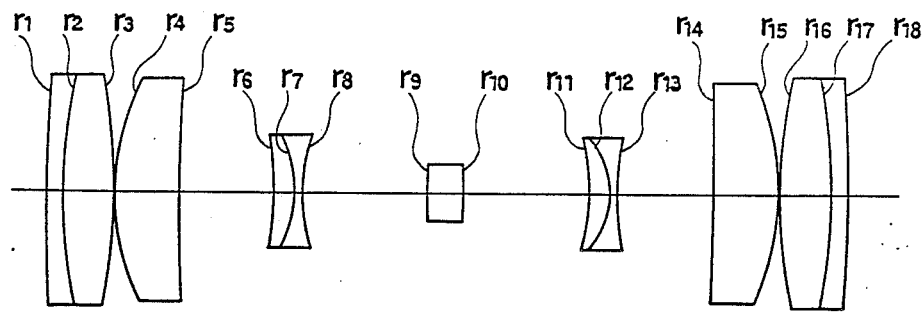
FIG. 17 is a lens construction and arrangement view showing a ninth embodiment.

FIG. 17 shows a lens construction and arrangement view of a ninth embodiment in which the lens systems of the seventh and eighth embodiments are combined with each other.

In this embodiment, astigmatism is corrected by lens groups disposed forwards and backwards from the plane face. Astigmatism in this embodiment is smaller than that of a lens system perfectly symmetrical with respect to the center-positioned plane face. Lens data for the respective lens groups shown in FIG. 17 are listed in TABLE 10.

TABLE 10

|    | r       | d     | n     | ν    |
|----|---------|-------|-------|------|
| 1  | 457.40  | 3.5   | 1.648 | 33.8 |
| 2  | 120.00  | 12.5  | 1.694 | 53.8 |
| 3  | −144.70 | 0.5   |       |      |
| 4  | 59.35   | 16.0  | 1.694 | 53.8 |
| 5  | 1850.00 | 22.65 |       |      |
| 6  | −78.75  | 5.0   | 1.620 | 60.3 |
| 7  | −30.20  | 1.8   | 1.595 | 35.5 |
| 8  | 41.15   | 30.8  |       |      |
| 9  | 98.90   | 8.6   | 1.620 | 60.3 |
| 10 | −98.90  | 30.7  |       |      |
| 11 | −42.10  | 5.0   | 1.620 | 60.3 |
| 12 | −19.00  | 1.8   | 1.613 | 37.0 |
| 13 | 82.60   | 22.65 |       |      |
| 14 | ∞       | 16.00 | 1.694 | 53.8 |
| 15 | −60.55  | 0.5   |       |      |
| 16 | 144.70  | 12.50 | 1.694 | 53.8 |
| 17 | −120.00 | 3.5   | 1.651 | 38.2 |
| 18 | −457.40 |       |       |      |

Figure 18:
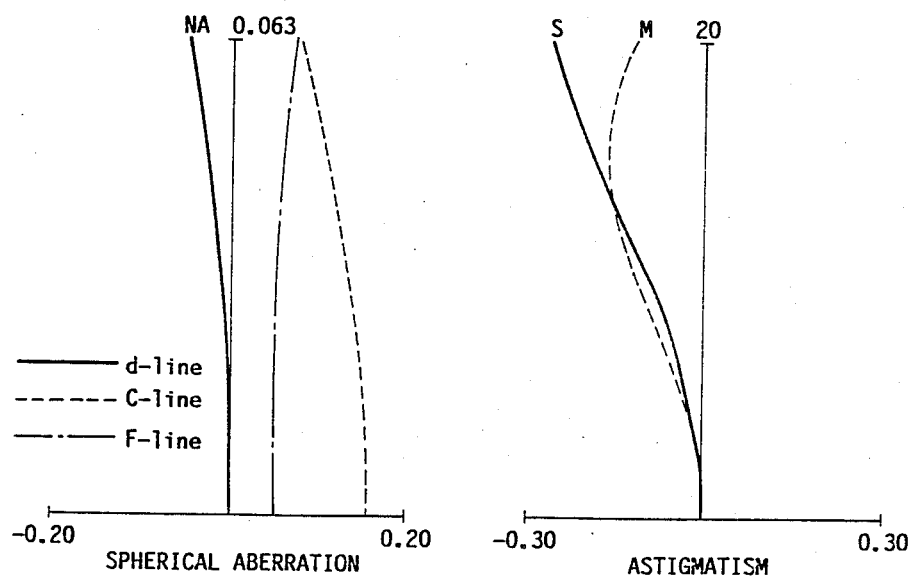
FIG. 18 shows aberration curves of the ninth embodiment.

$d_0$ (distance between object and face of curvature $r_1$): 111.37;
Distance between object and image: 417.44;
Image-forming magnification: 1;

FIG. 18 illustrates aberration curves showing the spherical aberration and the astigmatism of the ninth embodiment.

Figure 19:
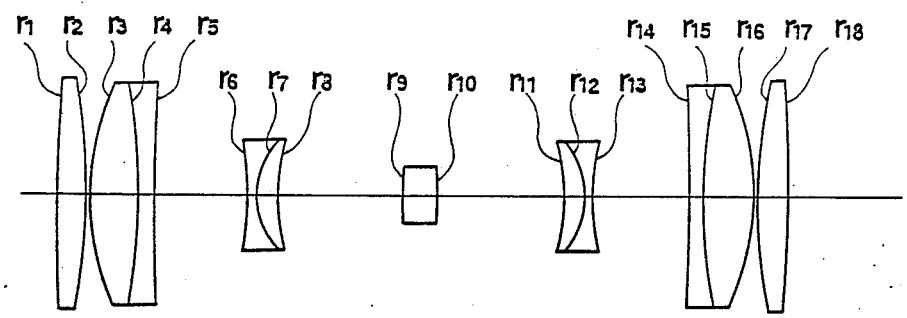
FIG. 19 is a lens construction and arrangement view showing the entire arrangement of the fifth embodiment for comparison with the lens system shown in FIG. 21.

FIG. 19 shows the lens system in which the lens system of the fifth embodiment shown in FIG. 9 is arranged symmetrically about the plane face $r_1$ (also shown in FIG. 9). This lens system constitutes an image-forming optical system in which the image of an object is magnified by one. This lens system is shown for comparison with the lens system shown in FIG. 21.

The lens data for the lenses shown in FIG. 19 are listed in the following TABLE 11.

TABLE 11

|    | r       | d     | n     | ν    |
|----|---------|-------|-------|------|
| 1  | 455.30  | 6.8   | 1.694 | 53.8 |
| 2  | −144.00 | 0.6   |       |      |
| 3  | 58.45   | 12.3  | 1.694 | 53.8 |
| 4  | −144.00 | 3.8   | 1.651 | 38.2 |
| 5  | 2100.00 | 22.4  |       |      |
| 6  | −77.75  | 1.8   | 1.613 | 37.0 |
| 7  | 18.45   | 5.0   | 1.620 | 60.3 |
| 8  | 41.00   | 30.8  |       |      |
| 9  | 98.45   | 8.6   | 1.620 | 60.3 |
| 10 | −98.45  | 30.8  |       |      |
| 11 | −41.00  | 5.0   | 1.620 | 60.3 |
| 12 | −18.45  | 1.8   | 1.613 | 37.0 |
| 13 | 77.75   | 22.4  |       |      |
| 14 | −2100.00| 3.8   | 1.651 | 38.2 |
| 15 | 144.00  | 12.3  | 1.694 | 53.8 |
| 16 | −58.40  | 0.6   |       |      |
| 17 | 144.00  | 6.8   | 1.694 | 53.8 |
| 18 | −455.30 |       |       |      |

$d_0$ (distance between object and face of curvature $r_1$): 118.38;
Distance between object and image: 412.35;
Image-forming magnification: 1;
Image size: 40 φ;
F-number: 8.3 (NA: 0.06)

Figure 20:
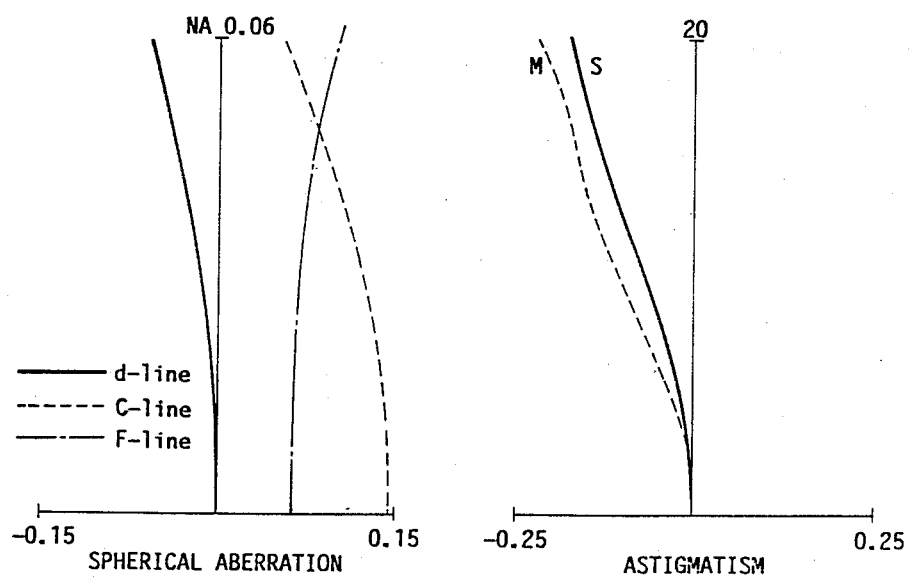
FIG. 20 shows aberration curves of the lens system shown in FIG. 19.

FIG. 20 illustrates aberration curves showing the spherical aberration and the astigmatism of the lens system shown in FIG. 19.

The focal length of the lens group disposed in front of the center of the lens system need not be the same as the focal length of the lens group disposed behind the center of the lens system. For example, a telecentric image-forming optical system whose image-forming magnification is M times an object size can be constituted as follows: The radius of curvature and the distance between adjacent faces of the lenses of a lens group disposed behind the center of the lens system are proportionally magnified or reduced by M times those of the lens group disposed in front of the center of the lens system.

Tenth Embodiment

Figure 21:
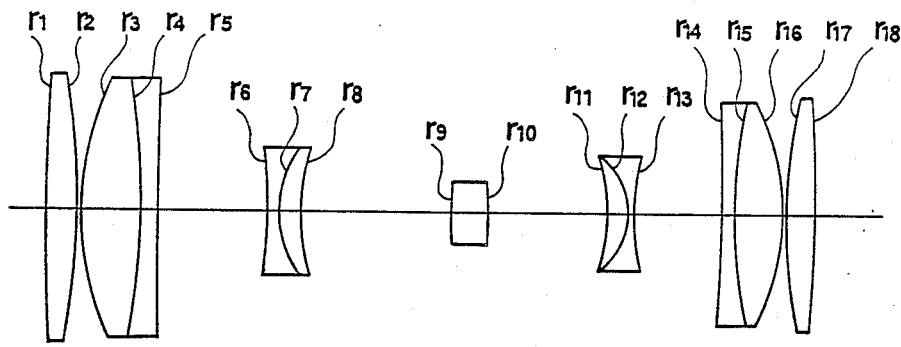
FIG. 21 is a lens construction and arrangement view showing a tenth embodiment.

FIG. 21 illustrates a lens construction and arrangement view showing a tenth embodiment in which the construction of the lenses disposed in front of the center of the lens system are the same as those of the fifth embodiment and the lenses disposed behind the center of the lens system are constructed by proportionally reducing the image-forming magnification of the lens system of the fifth embodiment by 0.8 times. Thus, a telecentric image-forming optical system whose image-forming magnification is 0.8 times is constituted. Lens data for the respective lens groups shown in FIG. 21 are listed in TABLE 12.

TABLE 12

|    | r       | d     | n     | ν    |
|----|---------|-------|-------|------|
| 1  | 455.30  | 6.8   | 1.694 | 53.8 |
| 2  | −144.00 | 0.6   |       |      |
| 3  | 58.45   | 12.3  | 1.694 | 53.8 |
| 4  | −144.00 | 3.8   | 1.651 | 38.2 |
| 5  | 2100.00 | 22.4  |       |      |
| 6  | −77.75  | 1.8   | 1.613 | 37.0 |
| 7  | 18.45   | 5.0   | 1.620 | 60.3 |
| 8  | 41.00   | 30.8  |       |      |
| 9  | 98.45   | 7.74  | 1.620 | 60.3 |
| 10 | −78.76  | 24.64 |       |      |
| 11 | −32.80  | 4.0   | 1.620 | 60.3 |
| 12 | −14.76  | 1.44  | 1.613 | 37.0 |
| 13 | 62.20   | 17.92 |       |      |
| 14 | −1680.00| 3.04  | 1.651 | 38.2 |
| 15 | 115.20  | 9.84  | 1.694 | 53.8 |
| 16 | −46.76  | 0.48  |       |      |
| 17 | 115.20  | 5.44  | 1.694 | 53.8 |
| 18 | −364.24 |       |       |      |

$d_0$ (distance between object and face of curvature $r_1$): 118.38;
Distance between object and image: 371.12;
Image-forming magnification: 0.8;
Image size: 32 φ;
F-number: 8.3 (NA: 0.06)

Figure 22:
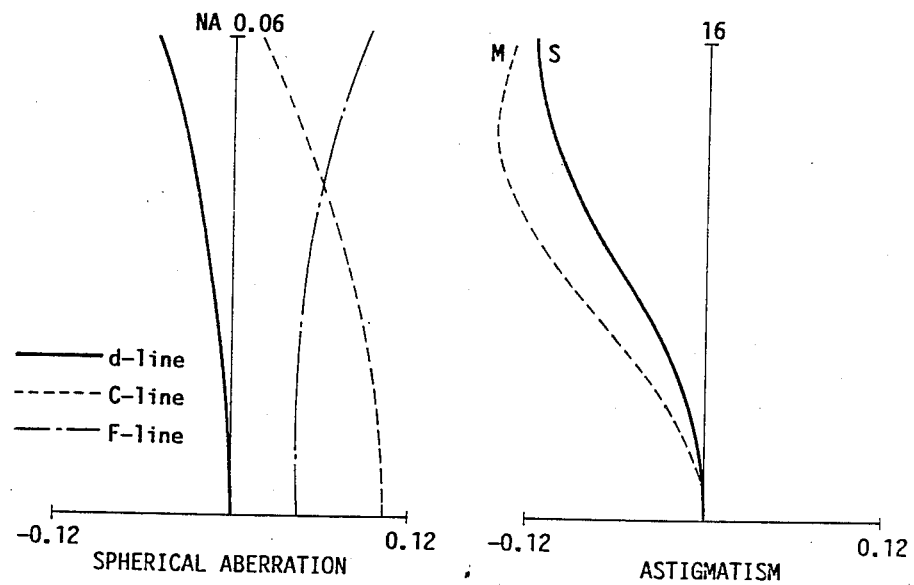
FIG. 22 shows aberration curves of the tenth embodiment.

FIG. 22 illustrates aberration curves showing the spherical aberration and the astigmatism of the tenth embodiment.

When a telecentric image-forming optical system which has an image-forming magnification (other than one) and forms a large image size is constituted, the following method may be adopted: One need not proportionally magnify or reduce the radii of curvature and the distances between adjacent faces of the lenses of the lens group as is done in the tenth embodiment. Instead, for example, a desired image-forming magnification can be obtained by shifting the double-convex lens from the center of the lens system.

Eleventh Embodiment

Figure 23:
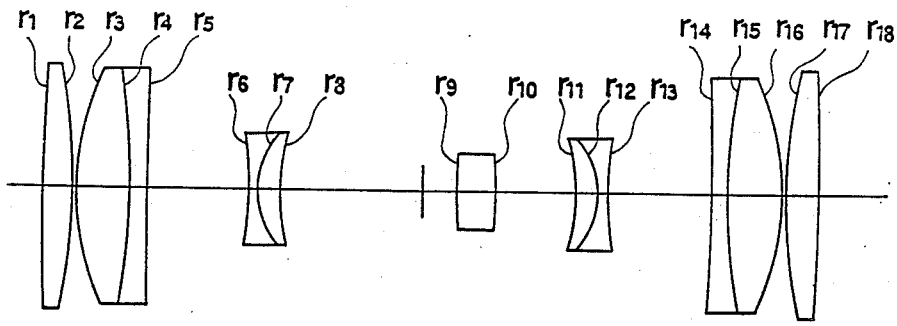
FIG. 23 is a lens construction and arrangement view showing an eleventh embodiment.

The lens groups of an eleventh embodiment are arranged by shifting a double-convex lens from the center of the lens system. FIG. 23 shows the lens arrangement of the lens system. Lens data for the respective lens groups shown in FIG. 23 are listed in TABLE 13.

TABLE 13

|    | r       | d     | n     | ν    |
|----|---------|-------|-------|------|
| 1  | 418.45  | 6.8   | 1.694 | 53.8 |
| 2  | −144.00 | 0.6   |       |      |
| 3  | 58.45   | 12.3  | 1.694 | 53.8 |
| 4  | −144.00 | 3.8   | 1.651 | 38.2 |
| 5  | 2460.00 | 22.4  |       |      |
| 6  | −76.43  | 1.8   | 1.613 | 37.0 |
| 7  | 17.48   | 5.0   | 1.623 | 58.2 |
| 8  | 40.49   | 40.0  |       |      |
| 9  | 114.46  | 8.6   | 1.620 | 60.3 |
| 10 | −86.15  | 17.85 |       |      |
| 11 | −40.49  | 5.0   | 1.623 | 58.2 |
| 12 | −17.48  | 1.8   | 1.613 | 37.0 |
| 13 | 76.43   | 22.4  |       |      |
| 14 | −2460.00| 3.8   | 1.651 | 38.2 |
| 15 | 144.00  | 12.3  | 1.694 | 53.8 |
| 16 | −58.45  | 0.6   |       |      |
| 17 | 144.00  | 6.8   | 1.694 | 53.8 |
| 18 | −418.45 |       |       |      |

$d_0$ (distance between object and face of curvature $r_1$): 125.5;
Distance between object and image: 410.24;
Image-forming magnification: 0.865;
Image size: 34.64 φ;
F-number: 8.9 (NA: 0.056)

Figure 24:
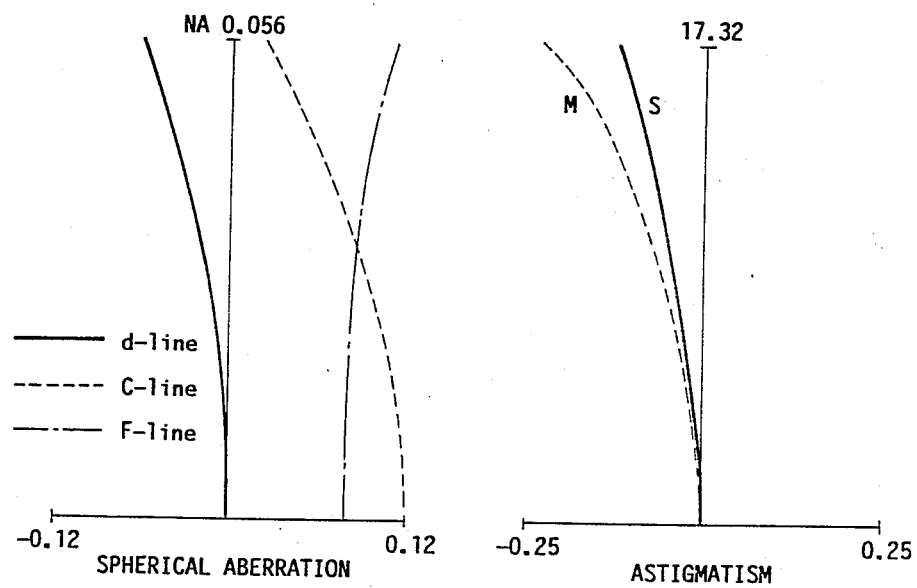
FIG. 24 shows aberration curves of the eleventh embodiment.

FIG. 24 illustrates aberration curves showing the spherical aberration and the astigmatism of the eleventh embodiment.

In the eleventh embodiment, the double-convex lens is not cemented, and therefore the lens is not achromatic. Therefore, if the double-convex lens is shifted such that the lens groups are unsymmetrical, a lateral chromatic aberration occurs. However, the magnification of a telecentric image-forming optical system is not varied even if the object distance is varied. Thus, an appropriate selection of the object distance (125.5 in this embodiment) corrects the lateral chromatic aberration without varying the image-forming magnification.

As apparent from the foregoing description, the present invention, has a relatively simple lens construction. The arrangement provides a telecentric image-forming optical system in which the dimensions of an image plane may be large compared with the distance between the object and the image surface. Further, an object may be magnified or reduced.

Furthermore, when the telecentric image-forming optical system in accordance with the present invention is used within an apparatus, the apparatus can be compactly manufactured because the length of the optical system is compact.

Application Example

An application example using an optical system in accordance with the present invention is described hereinbelow. The application example relates to a read apparatus for reading a block copy layout sheet to create a prepress in a printing process.

A block copy is formed at the initial stage of the prepress. The prepress specifies the arrangements of letters, line drawings, photographs and the like in a sheet to be printed. The specification accurately performed on a layout sheet is called a layout block copy or a block copy layout sheet.

The block copy layout sheet is formed by a digitizer or an automatic drafting machine. An original document to be laid out in a specified position is processed by a scanner and stored in a storing medium in the form of digital data. Data for laying out an image is necessary to read the data for reading the original document. The read apparatus of the block copy layout sheet reads out the data for laying out the image.

Figure 27:
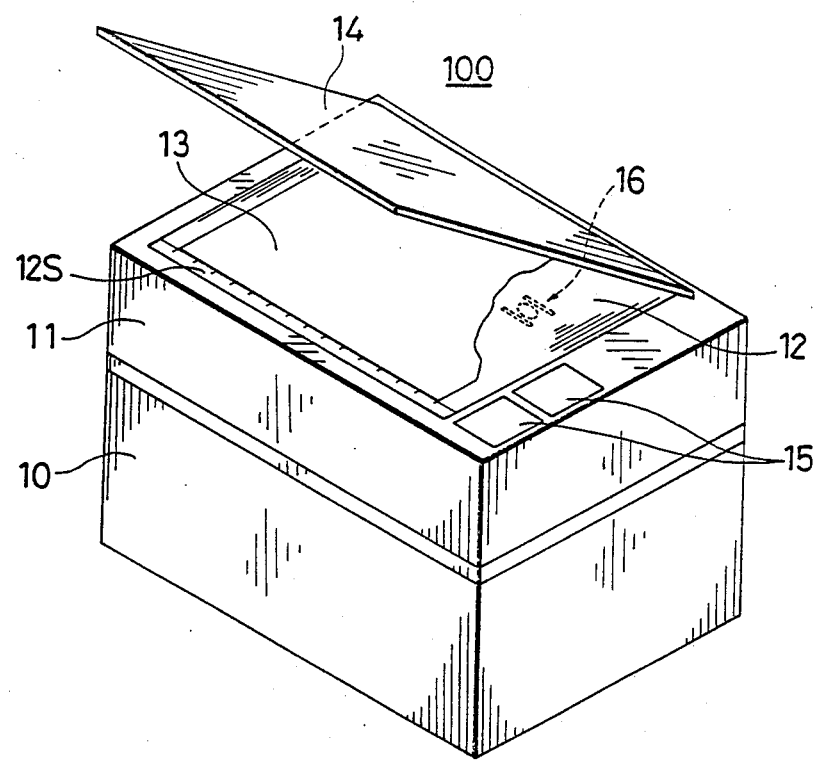
FIG. 27 is a schematic perspective view of an apparatus to which an optical system in accordance with the present invention may be applied.

FIG. 27 is a perspective view of a read apparatus 100 for reading a block copy layout sheet. The apparatus comprises an electric parts-mounted portion 10 provided at the lower portion thereof and a scan mechanism portion 11. The scan mechanism portion 11 is provided with a glass 12. In operation, an original document is placed on the glass 12. The periphery of the glass 12 is fixed to an inner frame disposed at the uppermost portion of the apparatus. A scale for positioning a block copy layout sheet on the glass 12 is provided in the longitudinal direction of the glass. The read apparatus is also provided with a cover 14 for covering the original document and an operation panel 15. When the start key on the operation panel 15 is turned on, a scanning head 16 shown by broken lines automatically moves to scan a block copy layout sheet 13.

The apparatus has a mechanism similar to a copying machine for copying documents and figures or an image reader for inputting an image to a personal computer. But the apparatus 100 differs from the copying machine or the image reader in two respects. One of the differences is that the area of a block copy layout sheet is as great as, for example, 655×869mm. The second difference is that it has a resolution as high as 1000~2000 lines/inch. That is, the apparatus 100 reads data from a great area and at a high resolution. The apparatus 100 is required to read out the data as fast as possible. But the following problem arises.

It is difficult to place a block copy layout sheet 13 on the glass 12 with no space left therebetween. Even if the block copy layout sheet is secured to the frame of the glass 12, the sheet flexes on the glass. In this case, a small mechanical error can greatly affect the optical system of the apparatus 100. In order to maintain a high resolution irrespective of the position of the layout sheet, magnification of an image on an image surface should not be varied even if there is a small change in the block copy layout sheet's position. It is for this reason that a telecentric image-forming optical system is used within the scanning head. Sheet are frequently pasted on some regions of the block copy layout sheet 13, so that the surface of the block copy layout sheet 13 becomes irregular or stepshaped. The problems caused by such irregularity can also be solved by the telecentric image-forming optical system.

Figure 28:
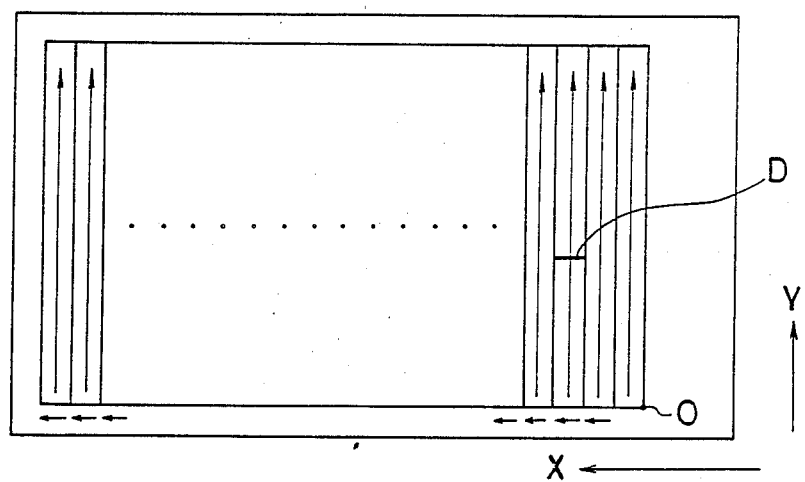
FIG. 28 is an explanatory view showing the movement of a scanning head of the apparatus.
Figure 29:
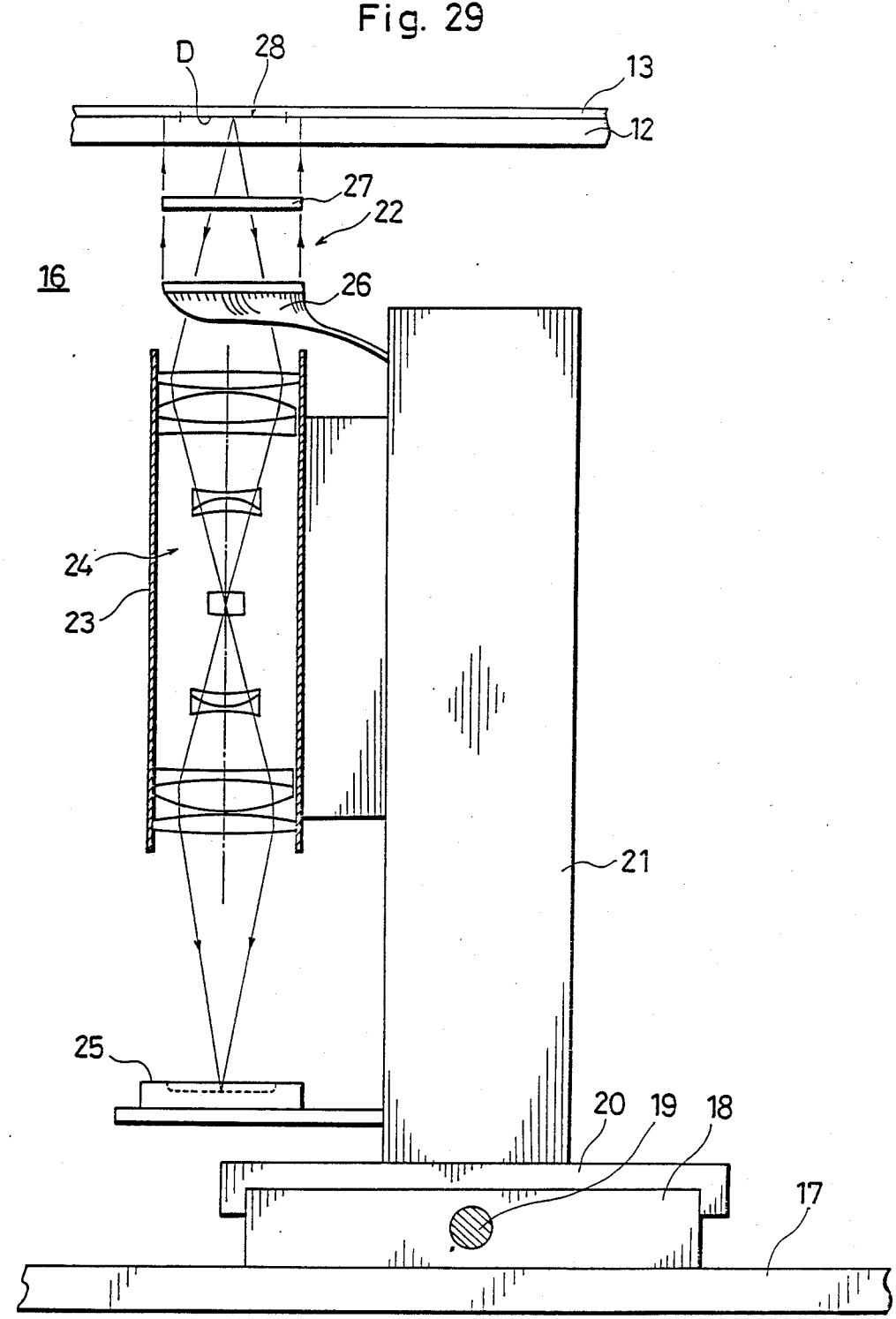
FIG. 29 is an explanatory view showing the scanning head portion.

In order to shorten the period of time required to read data, the scanning head 16 must scan the sheet 13 at a high speed. However, the scanning speed of the scanning head 16 is restricted to maintain a predetermined high resolution. To this end, the scanning width of a raster should be great. This is possible with an optical system which has a wide angle of view. However, in the Prior Art, it has been difficult to make a telecentric image-forming optical system with a wide angle of view. If the angle of view is made wide without making any countermeasures, the optical system itself becomes large. That is, the length of the optical system becomes long. It is difficult to use such a long optical system within the scanning head 16. In order to obtain a read range for the scanning head 16 to travel, the scanning head 16 must be compact. Thus, to shorten the length of the optical system a wide angle of view is necessary. In this sense, the telecentric image-forming optical system of the present invention in which the angle of view is wide compared with the whole length of the optical system is advantageous. FIG. 28 shows how the scanning head 16 scans an original document. FIG. 29 schematically shows the construction of the scanning head 16.

The scanning head 16 travels at a constant speed from the home position (O) in the Y-axis direction. At this time, the amount of the data which the scanning head 16 reads is (D). When it has reached an end point of the Y-axis, the head 16 returns to the home position (Y=0). Thereafter, the read width (D) is indexed in the X-axis direction, and then, the head 16 travels in Y-axis direction at a constant speed. Thus, the scanning head 16 moves in the shape of a comb and scans the entire surface of the block copy layout sheet. The scanning head 16 is controlled by a microcomputer and driven by a motor. According to this example, the read width (D) is 32mm and the effective read range is 515×728. The scanning head 16 completes a scanning when it scans the block copy layout sheet 26 times. It takes approximately 17 minutes for the scanning head 16 to complete the scanning when a scanning line density is 2000 lines/inch.

As shown in FIG. 29, the scanning head 16 travels below the glass 12 and parallel thereto. A base 18 is mounted on a rail 17 which extends in the X-axis direction at both end points disposed in the Y-axis direction. The base 18 is provided with a ball thread 19 in the Y-axis direction. The ball thread 19 extends through a moving base 20, so that the moving base 20 smoothly slides on the base 18 in the Y-axis direction by the rotation of the ball thread 19. A box-shaped supporting member 21 is mounted on the moving base 20 perpendicular thereto. An irradiation optical system 22 is fixed to the supporting member. A telecentric image-forming optical system 24 of the present invention is supported by a lens-barrel 23. The supporting member 21 supports the lens-barrel 23 and a one-dimensional CCD element 25.

The irradiation optical system 22 comprises a halogen lamp (not shown) serving as a light source, a collimator lens, an optical fiber 26 serving as an optical guide, and a cylindrical lens 27. A light emitted from the halogen lamp is focused on the upper surface of the glass 12 and incident at 45° on the top surface of the block copy layout sheet from a slit.

The image of a region 28 (corresponding to the scanning width (D)) of the block copy layout sheet 13 is formed on the light receiving face of the CCD 25 by the telecentric image-forming optical system 24. In this example, the CCD 25 reads approximately 2500 pixels. The area of one pixel is 12.7μm of the light receiving face.

While the invention has been illustrated and described as a telecentric image-forming system for producing a large image, it is not limited to the details shown. Various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A telecentric image-forming optical system comprising:
    a first lens group including a first double-convex lens, either a meniscus or plano-convex lens whose convex surface is directed to an object, and a double-concave lens arranged in order from an object side of said system;
    a second lens group including a double-concave lens, either a meniscus or plano-convex lens whose convex surface is directed to an image, and a second double convex lens arranged in order from an image side of said system; and
    a third double-convex lens disposed between said first and second lens groups;
    wherein the secondary focal point of the first lens group and the principal focal point of the second lens group substantially coincides with each other at the third double-convex lens or in the vicinity of the third double-convex lens.

2. A system as defined in claim 1, wherein one of said lenses is cemented with a glass material, said material having a refractive index and a dispersive power adapted to correct chromatic aberration.

3. A system as defined in claim 1, wherein the focal length of said first lens group is equal to the focal length of said second lens group.

4. A system as defined in claim 3, wherein the construction of said first lens group is the same as the construction of said second lens group.

5. A system as defined in claim 3, wherein the construction of said first lens group is different from the construction of said second lens group.

6. A system as defined in claims 3, 4 or 5, wherein said third double-convex lens is shifted from the position at which said focal points substantially coincide so that the magnification of said system is other than 1.0.

7. A system as defined in claim 1, wherein the focal length of said first lens group and the focal length of said second lens group are different from each other so that the magnification of said system is other than 1.0.

8. A system as defined in claim 7, wherein the dimensions of said second lens group are different from but proportional to the dimensions of said first lens group.

9. A system as defined in claim 7, wherein the construction of said first lens group is different from the construction of said second lens group.

10. An apparatus for reading an original document by scanning said original document by a solid image sensor comprising:
    an irradiation optical system for irradiating said original document;
    an image-forming system for converging a light flux reflected from said original document on said solid image sensor;
    said image-forming optical system including a telecentric image-forming optical system comprising a first lens group including a first double-convex lens, a meniscus or plano-convex lens whose convex surface is directed to said original document, and a double-concave lens arranged in order, from an object side of said system;
    and a second lens group including a double-concave lens, either a meniscus or plano-convex lens whose convex surface is directed to said solid image sensor, and a second double-convex lens arranged in this order from an image side of said system;
    a third double-convex lens disposed between said first and second lens groups;
    wherein the secondary focal point of the first lens group and the principal focal point of the second lens group substantially coincides with each other at the third double-convex lens or in the vicinity of the third double-convex lens.

11. An apparatus as defined in claim 10, said apparatus including a scanning head, said head being movable to scan the document.

12. An apparatus as defined in claim 11, wherein said scanning head is adapted to scan the document in a pattern which has the shape of a comb.

13. An apparatus as defined in claim 12, wherein the document is a block copy layout sheet and the scanning width of said scanning head is more than 30mm.

14. A telecentric optical system for forming an image, said system comprising:
    a first lens group, said first lens group including a first double-convex lens, a second lens and a third double-concave lens, said second lens being either a meniscus lens whose convex side faces said first lens or a plano-convex lens, said lenses being arranged in order with said second lens between said first lens and said third lens;

a second lens group, said second lens group including a fourth double-concave lens, a fifth lens and sixth double-convex lens, said fifth lens being either a meniscus lens whose convex side faces said fourth lens or a plano-convex lens, said lenses of said second lens group being arranged in order with said fifth lens between said fourth lens and said sixth lens; and a center double-convex lens disposed between said first and second lens groups; and wherein the secondary focal point of said first lens group and the principal focal point of said second lens group substantially coincide in the vicinity of said center lens.

15. An apparatus for reading an original document, said apparatus comprising:
(A) an optical system for irradiating the document,
(B) an image sensor; and
(C) a system for converging a light flux reflected from the document onto said sensor, said system comprising:

(1) a telecentric optical system for forming an image, said telecentric optical system comprising:
(2) a first lens group, said first lens group including a first double-convex lens, a second lens and a third double-concave lens, said second lens being either a meniscus lens whose convex side faces said first lens or a plano-convex lens, said lenses being arranged in order with said second lens between said first lens and said third lens;
(3) a second lens group, said second lens group including a fourth double-concave lens, a fifth lens and a sixth double-convex lens, said fifth lens being either a meniscus lens whose convex side faces said fourth lens or a plano-convex lens, said lenses of said second lens group being arranged in order with said fifth lens between said fourth lens and said sixth lens; and
(4) a center double-convex lens disposed between said first lens group and said second lens group, wherein the secondary focal point of said first lens group and the principal focal point of said second lens group substantially coincide in the vicinity of said center lens.

* * * * *